UNITED STATES PATENT OFFICE.

JAMES A. TILDEN, OF HYDE PARK, MASSACHUSETTS, ASSIGNOR TO HERSEY MANUFACTURING COMPANY, OF SOUTH BOSTON, MASSACHUSETTS.

PROCESS OF TREATING SPENT GRAIN.

SPECIFICATION forming part of Letters Patent No. 679,065, dated July 23, 1901.

Application filed January 22, 1898. Serial No. 667,632. (No specimens.)

*To all whom it may concern:*

Be it known that I, JAMES A. TILDEN, a citizen of the United States, residing at Hyde Park, in the county of Norfolk and State of Massachusetts, have invented a new and useful Improvement in Processes of Treating Spent Grain, of which the following is a specification.

My invention relates to an improved process of treating spent grains—such, for example, as are commonly known as "brewers' grains" or "distillers' slops;" and it has for its object to provide a simple and economic process of treating such grains in such a manner that they shall retain their nutritive qualities to the highest degree; and to these ends my invention consists in a process involving the steps or mode of operation substantially as hereinafter more particularly set forth.

It is well known that spent grains—such, for example, as brewers' grains—contain a considerable amount of valuable nutritive materials, and various ways of treating the material to preserve these qualities have been suggested. These spent grains as they come from breweries and similar places contain large amounts of water, ranging from seventy-five to even ninety per cent. of the total weight of the wet grains. Heretofore two general systems of treating the grains have been used, in one of which the entire amount of the water contained in the mass of wet grains has been evaporated by the application of heat; but the objection to this system is found in the expense attending the evaporation of so large an amount of water. In another system a portion of the water has been expelled by pressing the spent grains and the remainder evaporated, and the objection to this system lies in the fact that in the pressing of the grains a certain amount of valuable nutritive qualities of the grains is wasted, passing off in the water pressed from the mass of the grains.

In my improved process I am able to reduce the cost of drying the grains and at the same time retain the nutritive portions of the grains, and I will now proceed to describe the various steps or method of operation in carrying out my process.

I may state at the outset that in carrying out my process any desired apparatus capable of carrying on the mode of operation set forth may be used, my present invention being independent of any particular machinery or apparatus, as the steps of the process can be carried out in many and various ways, as will be clearly understood by those skilled in the art.

I will illustrate the process by describing it in connection with brewers' grains, and I will assume, for instance, that the grains as received for treatment contain, for example, eighty per cent. of water. The first step of the process consists in draining the mass of grains to remove a certain percentage of the water, which will pass off in the form of practically clear water without carrying with it the nutritive portions of the grain, and in this way I find that twenty-five per cent. of the water of the mass may be removed without detriment by what may be termed "gravity" filtration. Broadly speaking, no special filtering apparatus is necessary in carrying out this step of the process, as the wet grains may be simply piled on the floor and the water will drain and filter through the mass, or, what is preferable, the wet grains may be delivered to a suitable filtering-receptacle, where the free water will gradually filter down through the grains and pass off as practically clear water. The next step of the method consists in subjecting the mass of grains to pressure to squeeze out a large proportion of the water and to leave the grains in a relatively dry condition, and I find that by pressure fifty per cent. and upward of the original water can be easily removed from the mass; but in its removal more or less of the valuable nutritive qualities of the grains pass off with the expressed water, and has consequently been a waste of the material. The mass may be pressed in any suitable way, and any suitable apparatus adapted to the purpose can be used in carrying out this step of the process.

One of the distinguishing and perhaps the essential feature of my process relates to the saving of the nutritive portions of the grains carried off in the water pressed from the mass, and in order to do this I return the expressed liquid to the mass of wet grains being treated by the first step of the process, and I find that the valuable nutritive portions ordinarily carried off by the waste water from the pressed material are thus restored to the grains, apparently being absorbed or retained by the husks or cellular tissue of the grains, so that the material loses none of its valuable qualities, and the excess of water may be filtered off, as set forth in the first step of the process. This expressed liquid may be restored to the filtering mass by any suitable means, as by hand, or pumps, by gravity, or otherwise, depending upon the character and arrangement of the apparatus by which my process is carried out. The mass of material after being pressed may, if desired, be subjected to heat or dry air to evaporate or dry out any water remaining in the mass, and this may be accomplished in any suitable way or apparatus.

By this process I am enabled to eliminate the water from the grains without going to the expense of evaporating the entire amount by the application of heat, and I avoid the loss of the nutritive portions of the grains due to the pressing thereof and provide a practically continuous, rapid, and inexpensive process of treating spent grains.

The advantages of my process may be more apparent by a comparison with the ordinary systems. Starting, for instance, with a thousand pounds of wet grains, eight hundred pounds of which is water, for example, if this water was driven off entirely by heat it would involve a relatively large expense. If a large proportion of the water was driven off by pressure and the expressed water wasted, the expense of removing the water would be reduced, but a large amount of the valuable properties of the grains would be lost. By my process I first remove a certain portion of the excess of water by drainage and filtration, the water passing off as clear liquid, and I may say, for example, that two hundred pounds of the water are thus removed. I then subject the mass to pressure, removing, for example, four hundred pounds of the water, and as this water contains much of the nutritive properties of the grains it is restored to the mass being filtered, the nutritive portions being absorbed or retained by the husks or cellular tissue of the grains. The remaining two hundred pounds of water in the mass may then be evaporated by heat at relatively little expense. It will thus be seen that instead of evaporating the whole of the water by heat only a relatively small proportion of the water is so removed, the bulk of the water being removed by pressure and at the same time the valuable nutritive qualities being saved, so that the resultant product is superior and produced at a less expense than by the old processes.

What I claim is—

1. The process substantially as hereinbefore set forth of treating spent grains, which consists in removing a portion of the liquid from the mass of material by gravity filtration, subjecting the mass of material from which the liquid has thus been filtered to pressure to express a large proportion of the liquid, and returning the expressed liquid to the unpressed mass of material.

2. The process substantially as hereinbefore set forth of treating spent grains, which consists in removing a portion of the liquid from the mass of material by gravity filtration, subjecting the mass of material from which the liquid has been filtered to pressure to express a large portion of the liquid, returning the expressed liquid to the unpressed mass of material and subjecting the compressed mass to heat to evaporate the remaining liquid.

In testimony whereof I have signed my name to this specification in the presence of two subscribing witnesses.

JAMES A. TILDEN.

Witnesses:
F. L. FREEMAN,
W. CLARENCE DUVALL.